June 6, 1933.  C. DUNNING  1,912,571
ROLLER BEARING FOR CAR WHEEL JOURNALS
Filed Oct. 2, 1930  2 Sheets-Sheet 1
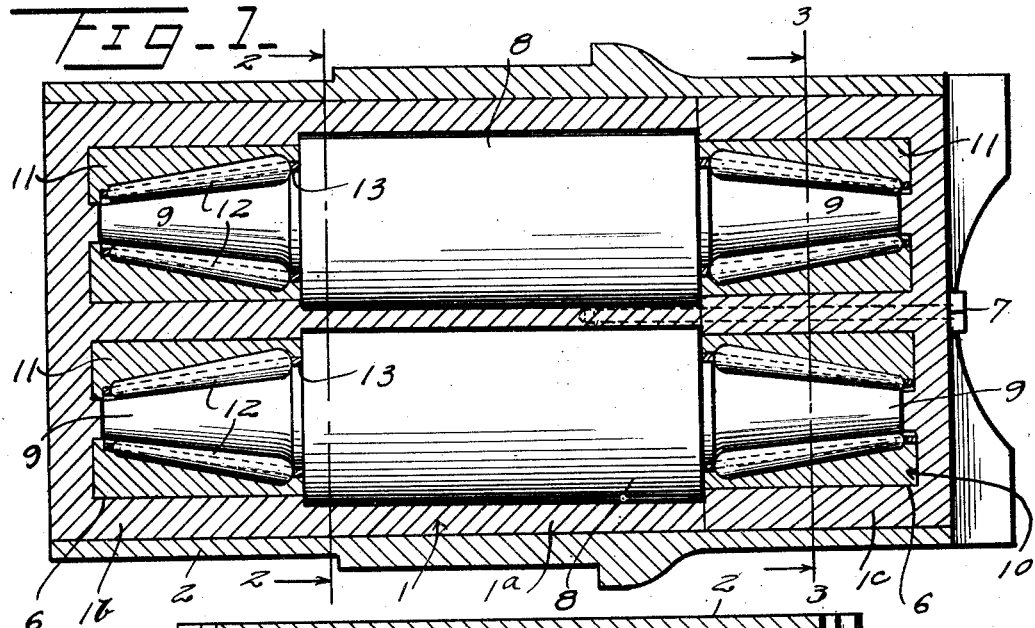
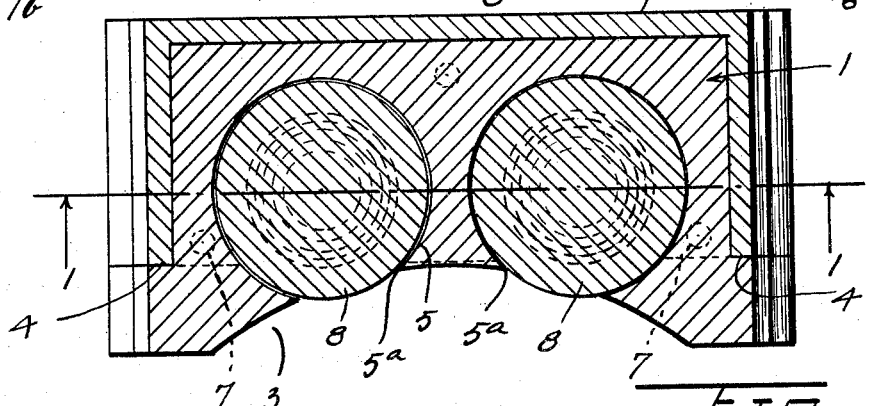
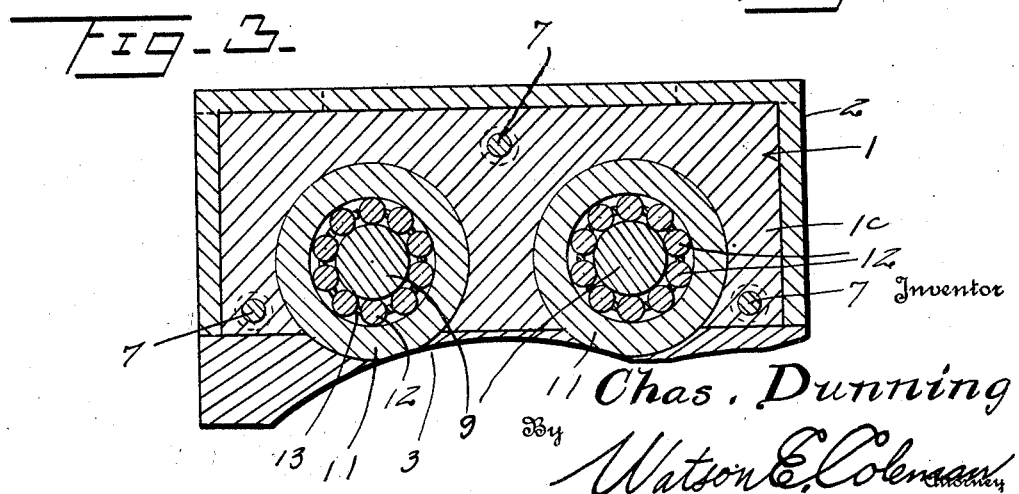
Inventor
Chas. Dunning
By Watson E. Coleman June 6, 1933. C. DUNNING 1,912,571
ROLLER BEARING FOR CAR WHEEL JOURNALS
Filed Oct. 2, 1930  2 Sheets-Sheet 2
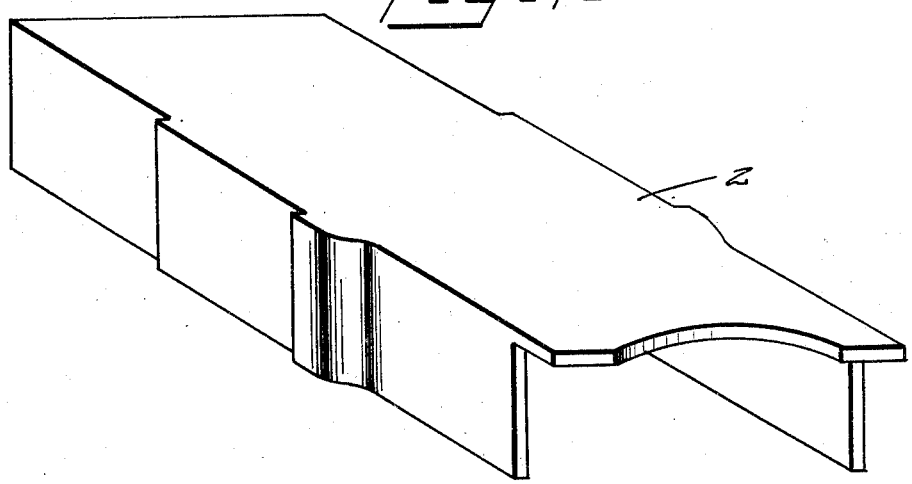
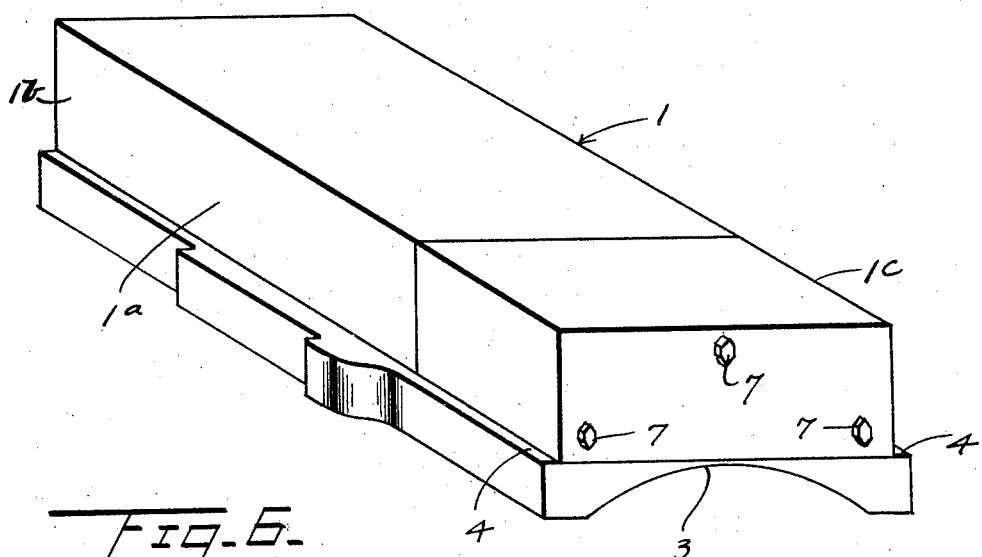
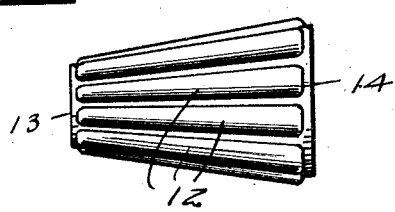
Inventor
Chas. Dunning
By Watson E. Coleman
Attorney Patented June 6, 1933

1,912,571

UNITED STATES PATENT OFFICE

CHARLES DUNNING, OF NEW ORLEANS, LOUISIANA

ROLLER BEARING FOR CAR WHEEL JOURNALS

Application filed October 2, 1930. Serial No. 486,005.

This invention relates to an anti-friction bearing of the roller type, and has for one of its objects to provide a novel, simple and highly efficient bearing of this character which shall be especially adapted for the wheel journals of railroad, street and interurban cars, which shall be adapted to be applied to such cars without making any changes in the journal boxes thereof, and which shall be adapted to function perfectly under the heaviest load to which it is likely to be subjected.

To attain the foregoing and other objects, the nature of which will appear as the description proceeds, the invention comprehends the provision of a bearing which shall embody a main body or casting adapted to be mounted in a journal box in place of the bearing brass, rollers carried by the body or casting and adapted to bear upon the upper side of the wheel journal parallel to and at opposite sides of the vertical longitudinal center of the wheel journal, and anti-friction units supporting the rollers in a body or casting.

The invention is hereinafter more fully described and claimed, and illustrated in the accompanying drawings, wherein:—

Figure 1 is a sectional view taken on a plane extending horizontally and longitudinally through the bearing, the plane of a section being indicated by the line 1—1 of Figure 2.

Figure 2 is a transverse sectional view taken on the vertical plane indicated by the line 2—2 of Figure 1.

Figure 3 is a similar view taken on the vertical plane indicated by the line 3—3 of Figure 1.

Figure 4 is a perspective view of the key of the bearing.

Figure 5 is a perspective view of the main body or casting of the bearing, and

Figure 6 is a view in side elevation of one of the anti-friction units for the rollers of the bearing.

The bearing comprises a main body or casting 1 and a key 2 which are similar externally to the bearing brass and the bearing brass key of the journal box of a railroad, street or interurban car, and which are adapted to be mounted in the journal box above the wheel journal in place of the bearing brass and the key. The body or casting 1 is provided in its lower side with a longitudinally extending groove 3 which is adapted to receive the upper side of the wheel journal. The key 2, which is adapted to hold the body or casting 1 in place in the journal box, is hollow and opened at its lower side and ends, and is mounted upon the body or casting and rests on shoulders 4 formed on the sides of the body or casting and extending longitudinally thereof.

The body or casting 1 is provided in its central or major portion 1a with cylindrical grooves 5 which are arranged at opposite side of the vertical longitudinal center of the body or casting and extend longitudinally thereof, the lower sides of the grooves being opened, as shown at 5a, and communicating with the groove 3. The body or casting 1 is provided in its end or minor portions 1b and 1c with cylindrical recesses 6 which are closed at their outer ends and communicate at their inner ends with the ends of the grooves 5. The end portion 1b is formed integrally with the central portion 1a, and the end portion 1c is formed independently of said first portions and secured to the central portion by machine bolts 7.

Rollers 8 are arranged in the grooves 5 and extend into the groove 3 through the open lower sides 5a of the grooves 5. The rollers 8 are provided at their ends with spindles 9 which gradually reduce in diameter in directions away from the rollers, and these conical spindles are journaled in anti-friction units 10 arranged in the recesses 6. These units comprise races 11 having outer cylindrical surfaces and inner conical surfaces, conical rollers 12 located between the spindles 9 and inner conical surfaces of the races, and spacing cones 13 arranged in the races and provided with openings 14 through which the rollers extend. The races 11 fit snugly in the recesses 6.

As the body or casting 1 and key 2 are similar externally to the bearing brass and bearing brass key of a journal box, it is only necessary to remove the bearing brass and key from the journal box in order to adapt the latter of the application thereto of my improved bearing. When the bearing is in place it occupies a position between the load and the wheel journal. Due thereto, as the rollers 8 are supported in the body or casting 1 by the anti-friction units 10, and as the rollers 8 bear upon the wheel journal at opposite sides of the vertical longitudinal center thereof, the wheel journal will rotate under its load with the minimum of friction. The bearing is strong and durable as well as highly efficient, and it may be manufactured and sold at a comparatively low cost.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:

A bearing of the character set forth, comprising a body or casting consisting of a central and end portions provided in their lower sides with a longitudinal groove of arcuate formation in cross section, one end portion being formed integrally with and the other being removable from the central portion, means detachably securing the removable end portion to the central portion, the central portion being provided with longitudinally extending grooves communicating at their lower sides with said first groove, the end portions being provided with cylindrical recesses closed at their outer ends and communicating at their inner ends with said cylindrical grooves, rollers journaled in said cylindrical grooves and having portions thereof extending into said first groove, races having cylindrical outer surfaces and conical inner surfaces and located in said recesses, spindles on the ends of the rollers and arranged in the races, conical rollers arranged between the spindles and the conical surfaces of the recesses, shoulders on the sides of the body or casting and extending longitudinally thereof, and a cover open at its lower side and ends and embracing the upper and lateral sides of the central and end portions of the body or casting and resting upon said shoulders.

In testimony whereof I hereunto affix my signature.

CHARLES $\overset{\text{his}}{\underset{\text{mark}}{\times}}$ DUNNING.

Witnesses:
E. L. COLOMES,
W. F. DEMOREST.